US012508741B2

(12) United States Patent
Liu et al.

(10) Patent No.: US 12,508,741 B2
(45) Date of Patent: Dec. 30, 2025

(54) INGOT WAFERING SYSTEMS AND METHODS FOR SLICING A SILICON INGOT

(71) Applicant: GlobalWafers Co., Ltd., Hsinchu (TW)

(72) Inventors: Chia Ming Liu, Hsinchu (TW); Chien Ming Chen, Hsinchu (TW); Jui Hung Wang, Hsinchu (TW); Hao Chen, Hsinchu (TW)

(73) Assignee: GlobalWafers Co., Ltd., Hsinchu (TW)

( * ) Notice: Subject to any disclaimer, the term of this patent is extended or adjusted under 35 U.S.C. 154(b) by 0 days.

(21) Appl. No.: 18/818,218

(22) Filed: Aug. 28, 2024

(65) Prior Publication Data

US 2024/0416556 A1 Dec. 19, 2024

Related U.S. Application Data

(62) Division of application No. 18/313,441, filed on May 8, 2023, now Pat. No. 12,115,699, which is a division of application No. 16/697,709, filed on Nov. 27, 2019, now Pat. No. 11,752,665.

(30) Foreign Application Priority Data

Nov. 30, 2018 (TW) ................................ 107143056
Nov. 30, 2018 (TW) ................................ 107143057

(51) Int. Cl.
*B28D 5/00* (2006.01)
*B28D 5/04* (2006.01)

(52) U.S. Cl.
CPC ........... *B28D 5/0076* (2013.01); *B28D 5/045* (2013.01)

(58) Field of Classification Search
CPC .............................. B28D 5/0076; B28D 5/045
See application file for complete search history.

(56) References Cited

U.S. PATENT DOCUMENTS

2012/0238186 A1 9/2012 Asai et al.

FOREIGN PATENT DOCUMENTS

| | | |
|---|---|---|
| CN | 102626957 A | 8/2012 |
| CN | 205112122 U | 3/2016 |
| TW | M512458 U | 11/2015 |

*Primary Examiner* — Vishal V Vasisth
(74) *Attorney, Agent, or Firm* — Armstrong Teasdale LLP

(57) ABSTRACT

A slurry sprayer for supplying a slurry to a wire saw during ingot slicing is disclosed. The slurry sprayer includes a main body and a cover plate that is detachable from the main body for cleaning the slurry sprayer. In some embodiments, the slurry sprayer includes an adjustable support that allows the incline angle of the sprayer to be adjusted and allows the vertical and horizontal position of the slurry sprayer to be adjusted. In some embodiments, the slurry sprayer includes two feed openings to allow the slurry pressure to be more equalized across the slurry sprayer.

5 Claims, 13 Drawing Sheets

INGOT WAFERING SYSTEMS AND METHODS FOR SLICING A SILICON INGOT

CROSS-REFERENCE TO RELATED APPLICATIONS

This application is a Divisional of U.S. Non-provisional patent application Ser. No. 18/313,441, filed May 8, 2023, now U.S. Pat. No. 12,115,699, which is a Divisional of U.S. Non-provisional patent application Ser. No. 16/697,709, filed Nov. 27, 2019, now U.S. Pat. No. 11,752,665, which claims priority to Taiwanese Patent Application No. 107143056, filed Nov. 30, 2018 and Taiwanese Patent Application No. 107143057, filed Nov. 30, 2018. Each application is incorporated herein by reference in its entirety.

FIELD OF THE DISCLOSURE

The field of the disclosure generally relates to slurry sprayers and to supports for slurry sprayers. The field of the disclosure also generally relates to methods for slicing a silicon ingot.

BACKGROUND

Electronic chip and solar cell chips are fabricated from wafers sliced from ingots of silicon. Such ingots may be sliced by a wire saw (e.g., having a web of diamond wire). When slicing crystal ingots, the friction between the wafer and the wire generates heat, which increases the temperature of the wafer. Heat is conventionally dissipated by spraying the ingot and wire by a water jet discharge from a slurry sprayer. Conventional slurry sprayers are generally made by integrated molding. It is difficult to thoroughly remove the impurities and dirt inside the slurry sprayer during cleaning.

When slicing crystal ingots, the wire (e.g., diamond wire) may be at least wrapped on a main roller, which allows the wire to move synchronously with the main roller. After longer periods of use, the wire may wear the surface of the main roller. The surface is often flattened and smoothed to allow the roller to be used for longer periods. This causes the diameter of the main roller to gradually decrease which further lowers the contact position between the wire and the crystal ingot. Supports for conventional slurry sprayers are soldered in the crystal ingot wire saw which prevents adjustment of the slurry sprayer relative to the wire saw. When the contact position of the wire lowers, conventional slurry sprayers are not able to adjust correspondingly, which further leads to poor cooling efficiency when slicing crystal ingots.

There exists a need for slurry sprayers that may be cleaned more thoroughly and for slurry sprayer supports that allow the position of the sprayer to be adjusted.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a slurry sprayer having a longitudinal axis. The slurry sprayer includes a main body having a top, a bottom opposite the top, a front and a rear opposite the front. A chamber is defined in the main body for receiving slurry. A plurality of discharge outlets are arranged along the longitudinal axis that extend through the top. A feed opening extends through the front. The feed opening is fluidly connected to the discharge outlets by the chamber. The slurry sprayer includes a cover plate detachably connected to the main body.

Another aspect of the present disclosure is directed to a slurry spray system. The slurry spray system has a slurry sprayer having a main body. The main body has a feed opening and a plurality of discharge openings. The slurry spray system includes a plurality of nozzles removably connected to a top of the main body. Each nozzle is aligned with a discharge opening. The slurry spray system includes an adjustable support for the slurry sprayer. The adjustable support includes a first supporting body that supports the slurry sprayer toward a first end of the slurry sprayer. The first supporting body includes a first fixed base and a first moving member moveable with respect to the first fixed base in a first direction. The first supporting body includes a second moving member moveable with respect to the first moving member in a second direction. The first supporting body also includes a positioning base that is rotatable with respect to the second moving member. The adjustable support includes a second supporting body that supports the slurry sprayer toward a second end of slurry sprayer.

A further aspect of the present disclosure is directed to an ingot wafering system. The ingot wafering system includes a first roller, a second roller, and a wire web at least partially disposed about the first roller and the second roller. The ingot wafering system includes a first slurry spray system for applying slurry. The first slurry spray system is disposed toward the first roller and includes a first slurry sprayer having a main body. The main body includes a plurality of discharge outlets, a first feed opening fluidly connected to the discharge outlets, and a second feed opening fluidly connected to the discharge outlets. The first slurry spray system includes a plurality of nozzles disposed on the main body. Each of the nozzles is fluidly connected to a discharge outlet. The ingot wafering system includes a second slurry spray system for applying slurry. The second slurry spray system is disposed toward the second roller and includes a second slurry sprayer having a main body. The main body of the second slurry sprayer has a plurality of discharge outlets, a first feed opening fluidly connected to the discharge outlets, and a second feed opening fluidly connected to the discharge outlets. The second slurry spray system includes a plurality of nozzles disposed on the main body. Each of the nozzles is fluidly connected to a discharge outlet.

Yet another aspect of the present disclosure is directed to a method for slicing a silicon ingot. A slurry sprayer is positioned onto a first supporting body. The first supporting body supports the slurry sprayer toward a first end of the slurry sprayer. The slurry sprayer is positioned onto a second supporting body. The second supporting body supports the slurry sprayer toward a second end of the slurry sprayer. The first and second supporting bodies are adjusted to set the position of the slurry sprayer in a horizontal and vertical position and to set an incline angle of the slurry sprayer. Slurry is directed from the sprayer to a wire web that contacts the silicon ingot to slice the silicon ingot into wafers. A silicon ingot is moved relative to the wire web while moving the wire web across the ingot to slice the silicon ingot into wafers.

Various refinements exist of the features noted in relation to the above-mentioned aspects of the present disclosure.

Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 9:
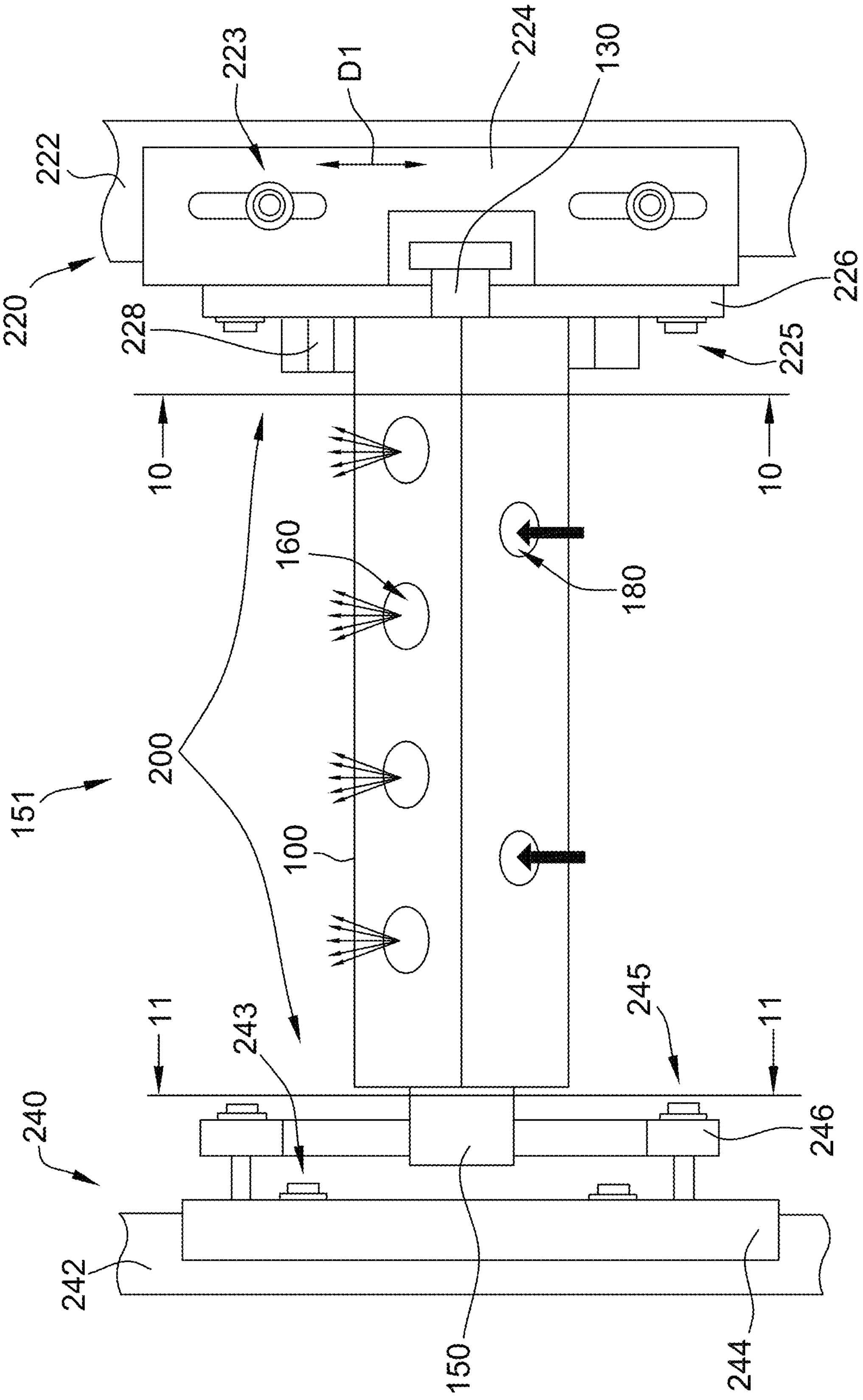
FIG. 9 is a top view of an embodiment of an adjustable support shown supporting the slurry sprayer.
Figure 10:
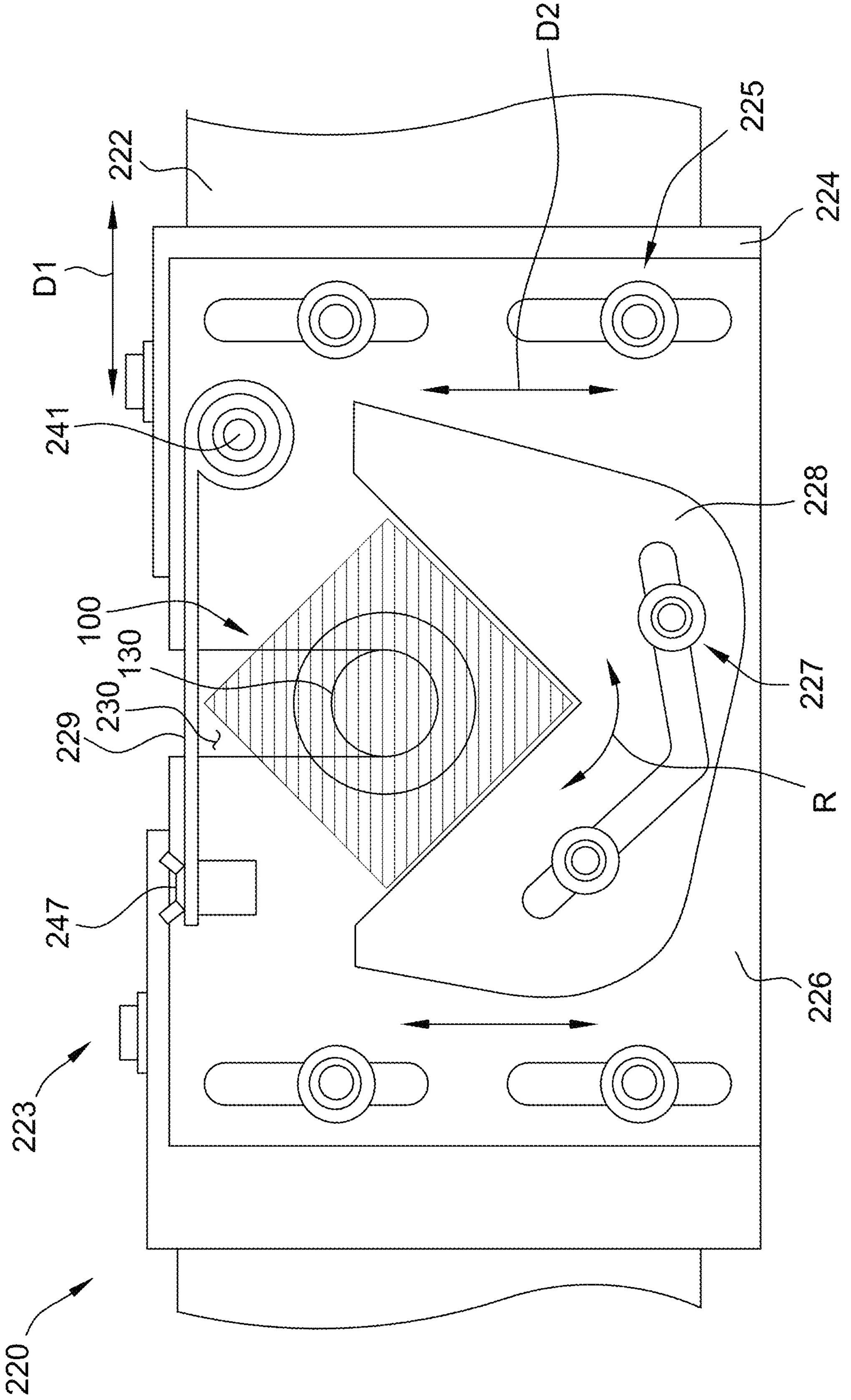
FIG. 10 is a cross-section view taken along line 10-10 of FIG. 9.
Figure 11:
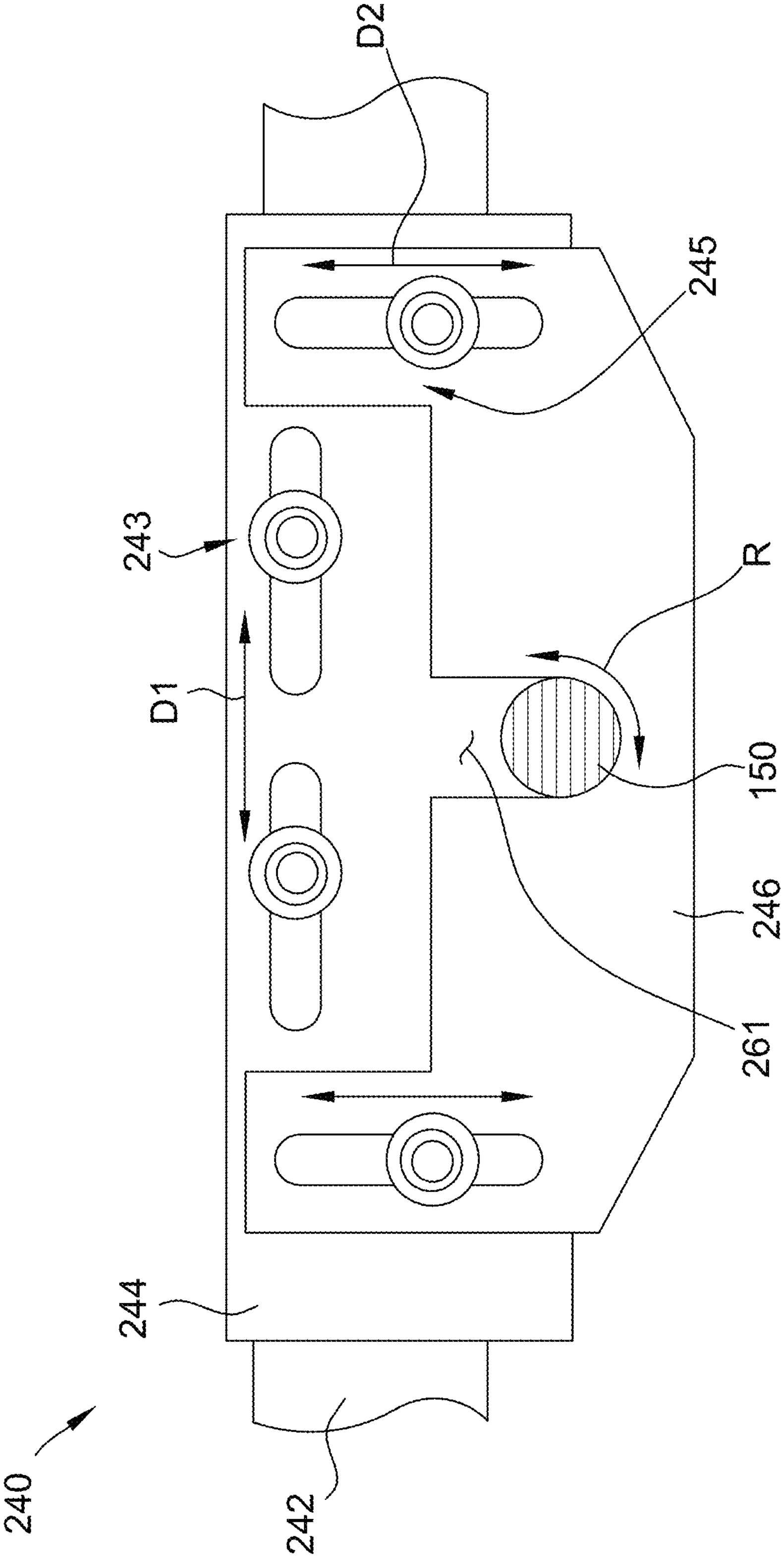
FIG. 11 is a cross-section view taken along line 11-11 of FIG. 9.

A slurry sprayer 1 of an embodiment of the present disclosure is shown in FIGS. 1-8B. The slurry sprayer 1 includes a main body 100 and a cover plate 110 (FIGS. 2 and 4) that is detachable from the main body. The main body 100 includes a plurality of discharge outlets 160 (four shown) and a plurality of feed openings 180 (two shown). The slurry sprayer 1 may be part of a slurry spray system 151 (FIGS. 8A and 8B) that also includes a plurality of nozzles 170 and an adjustable support 200 (FIGS. 9-11).

The slurry sprayer 1 has a longitudinal axis AX that extends through a first end 117 and a second end 119 of the slurry sprayer 1. The main body 100 extends along the longitudinal axis AX. The main body 100 of the slurry sprayer 1 includes a chamber 122 defined therein through which slurry flows. The main body 100 includes first and second lips 140 (FIG. 3) which extend outward from the main body 100 and define a slot 124 (FIG. 2) for receiving the cover plate 110.

The term "slurry" as used herein should not be considered in a limited sense. Reference herein to "slurry" includes liquid formulation which include abrasive particles and formulation which do not include abrasive particles (e.g., water).

The main body 100 of the slurry sprayer 1 may have any suitable shape that allows the sprayer 1 to function as described herein. In the illustrated embodiment, the main body 100 of the slurry sprayer 1 has a rectangular profile (i.e., rectangular cross-section). The main body 100 includes a top 105 (FIG. 1) and a bottom 107 (FIG. 3) opposite the top 105. The main body includes a front 109 (FIG. 2) and rear 111 (FIG. 5) opposite the front 109. In other embodiments, the main body 100 is cylindrical.

Figure 8A:
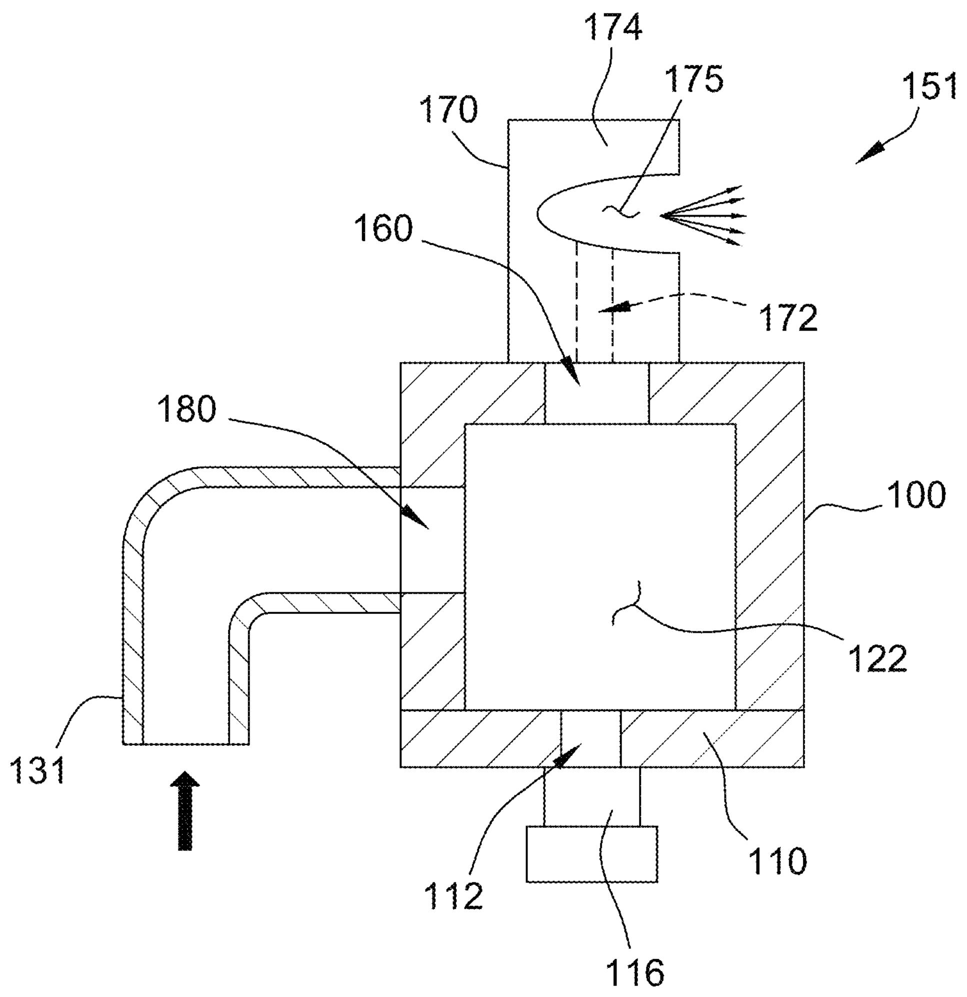
FIG. 8A is a cross-section view taken along line 8A-8A of FIG. 7.
Figure 8B:
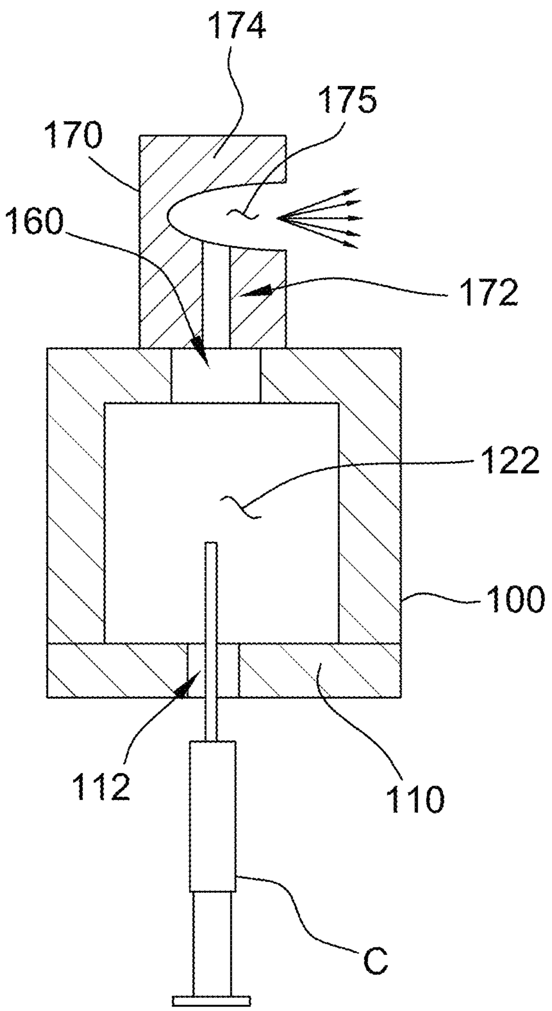
FIG. 8B is another cross-section view taken along line 8B-8B of FIG. 7.

Each discharge outlet 160 of the main body 100 is fluidly connected to a nozzle 170 (FIG. 8A). Each of the feed openings 180 is connected to a feed conduit 131 (FIGS. 5-6) which is fluidly connected to a slurry source. The nozzles 170 and first and second feed conduits 131 are generally not components of the slurry sprayer 1 and are separate components. The slurry sprayer 1, nozzles 170, first and second feed conduits 131 and adjustable support 200 described below may be part of a slurry spray system 151 (FIGS. 8A and 8B).

The discharge outlets 160 are arranged on the main body 100 along the longitudinal axis AX and extend through the top 105 of the main body 100. Each of the discharge outlets 160 is in fluid communication with the chamber 122 formed in the main body 100. The feed openings 180 are also arranged on the main body 100 along the longitudinal axis AX. The feed openings 180 extend through the front 109 of the main body 100. Each feed opening 180 is in fluid communication with the chamber 122 formed in the main body 100. As shown in the Figures, the feed openings 180 and discharge outlets 160 are perpendicular to each other (i.e., the center axes that extend through the feed openings 180 and through the discharge outlets 160 are offset about 90° from each other).

Figure 1:
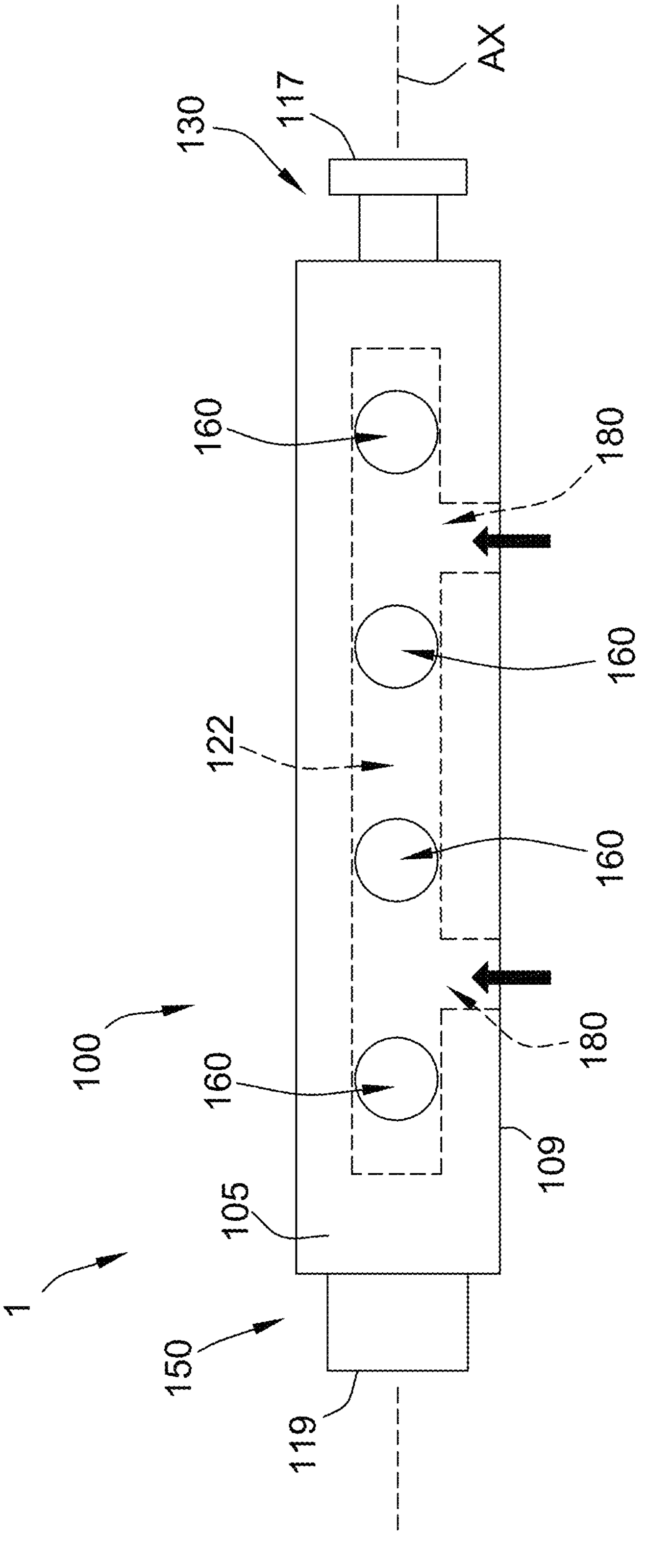
FIG. 1 is a top view of an embodiment of a slurry sprayer wherein the dotted lines indicate the positions of the chamber and the feed opening.
Figure 2:
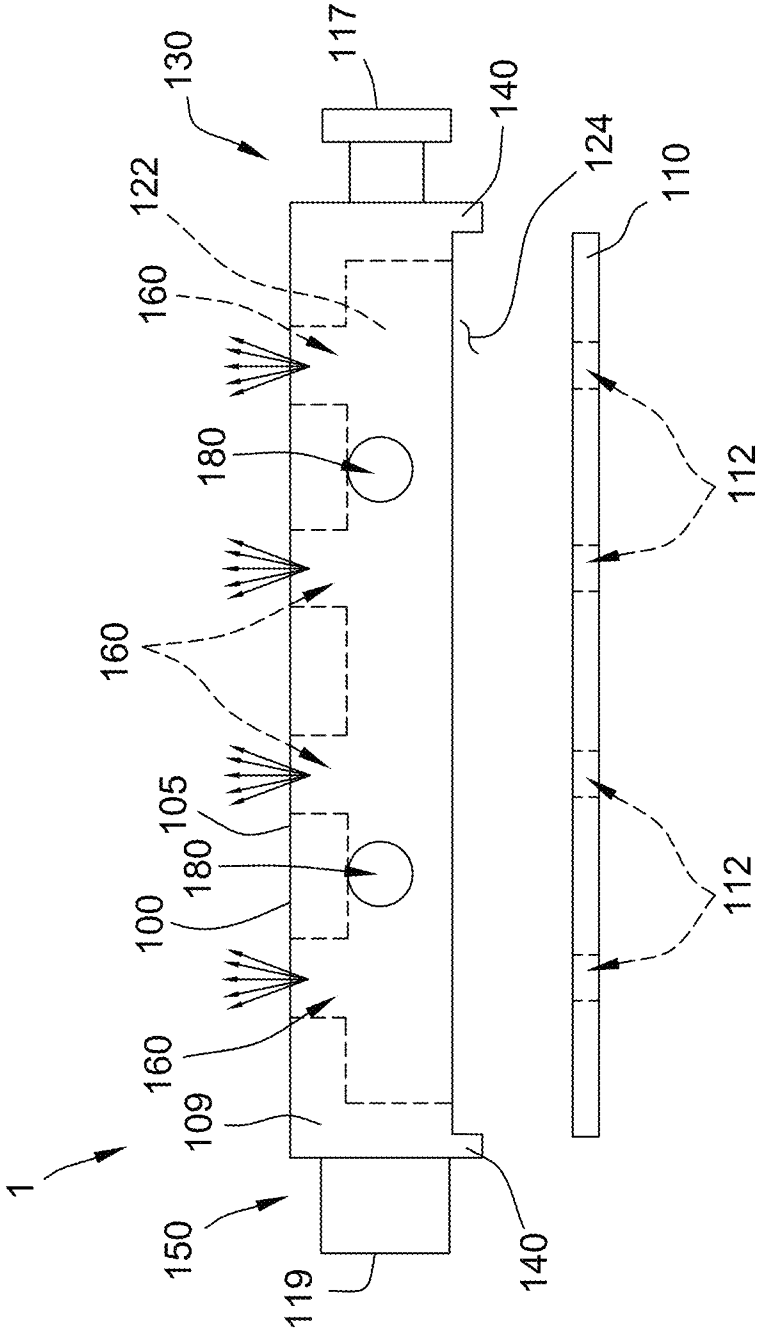
FIG. 2 is a front view of the slurry sprayer with the cover plate being separated from the main body, wherein the dotted lines indicate the positions of the chamber, the discharge outlets and the access apertures.
Figure 3:
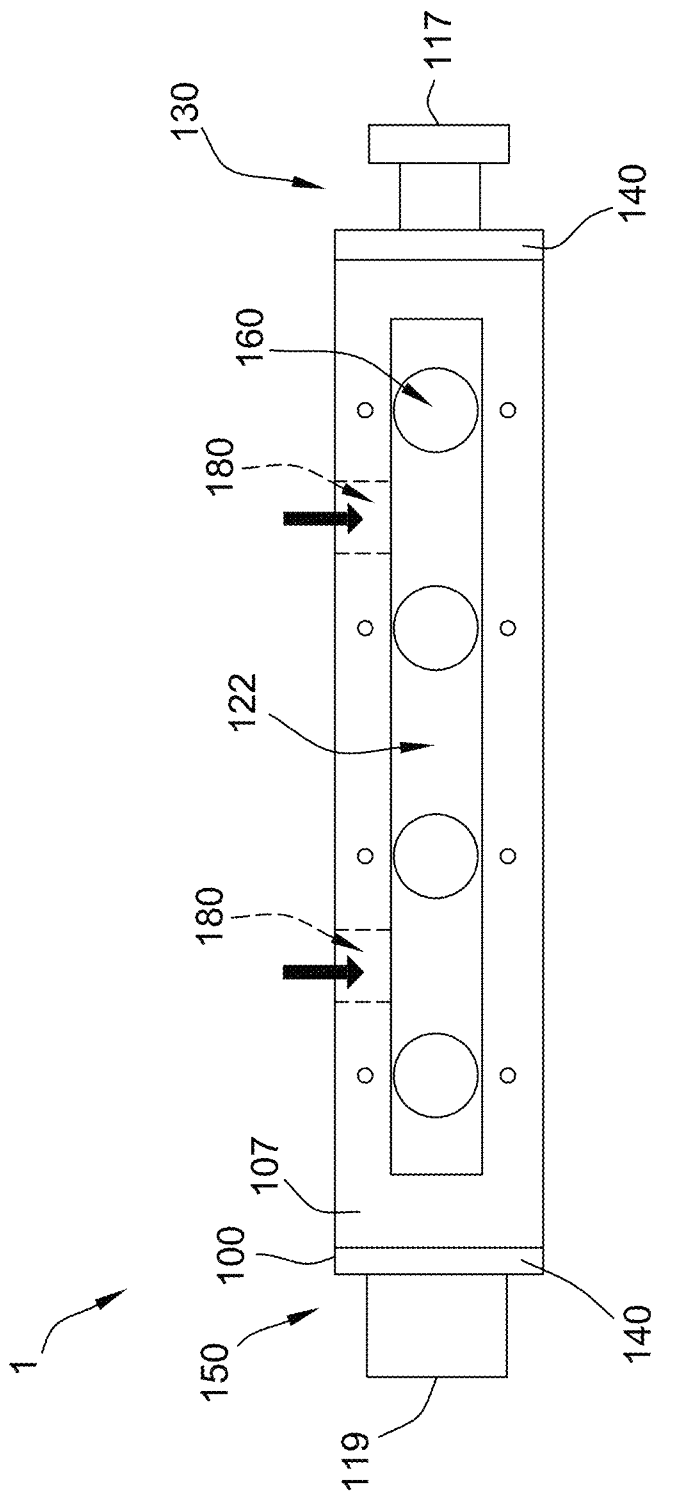
FIG. 3 is a bottom view of the slurry sprayer with the cover plate removed, wherein the dotted lines indicate the position of the feed openings.

The feed openings 180 are fluidly connected to the chamber 122 within the main body 100 which is fluidly connected to the discharge outlets 160. As shown in FIGS. 1-2, each feed opening 180 is offset from adjacent discharge openings along the longitudinal axis AX (i.e., each feed opening 180 is disposed between two discharge outlets 160 relative to the longitudinal axis AX). In the illustrated embodiment, in order to better balance the pressure at each discharge outlet 160, the two feed openings 180 are arranged symmetrically along the longitudinal axis AX. In other embodiments, the feed openings are not symmetrical.

In the illustrated embodiment, the slurry sprayer 1 has four nozzles 170 and four corresponding discharge outlets 160. The slurry sprayer 1 may have any number of nozzles 170 and discharge outlets 160 that allow the slurry sprayer 1 to function as described herein. For example, the slurry sprayer 1 may include 2, 3, 4, 6, 8, or 10 or more nozzles 170 and corresponding discharge outlets 160. In the illustrated embodiment, the slurry sprayer 1 includes two feed openings 180. The slurry sprayer 1 may have any number of feed openings 180 that allow the slurry sprayer 1 to operate as described herein. For example, the slurry sprayer 1 may include 1, 2, 3, 4 or more feed openings 180.

In some embodiments, the slurry sprayer 1 has a number of nozzles 170 (and corresponding discharge outlets 160) and a number of feed openings 180 such that the ratio of nozzles 170 (and corresponding discharge outlets 160) to feed openings is less than 8:1. In some embodiments, the ratio of the number of nozzles 170 (and corresponding discharge outlet 160) to the number of feed openings 180 is 5:1 or less, 4:1 or less, 3:1 or less or 2:1 or less.

Figure 4:
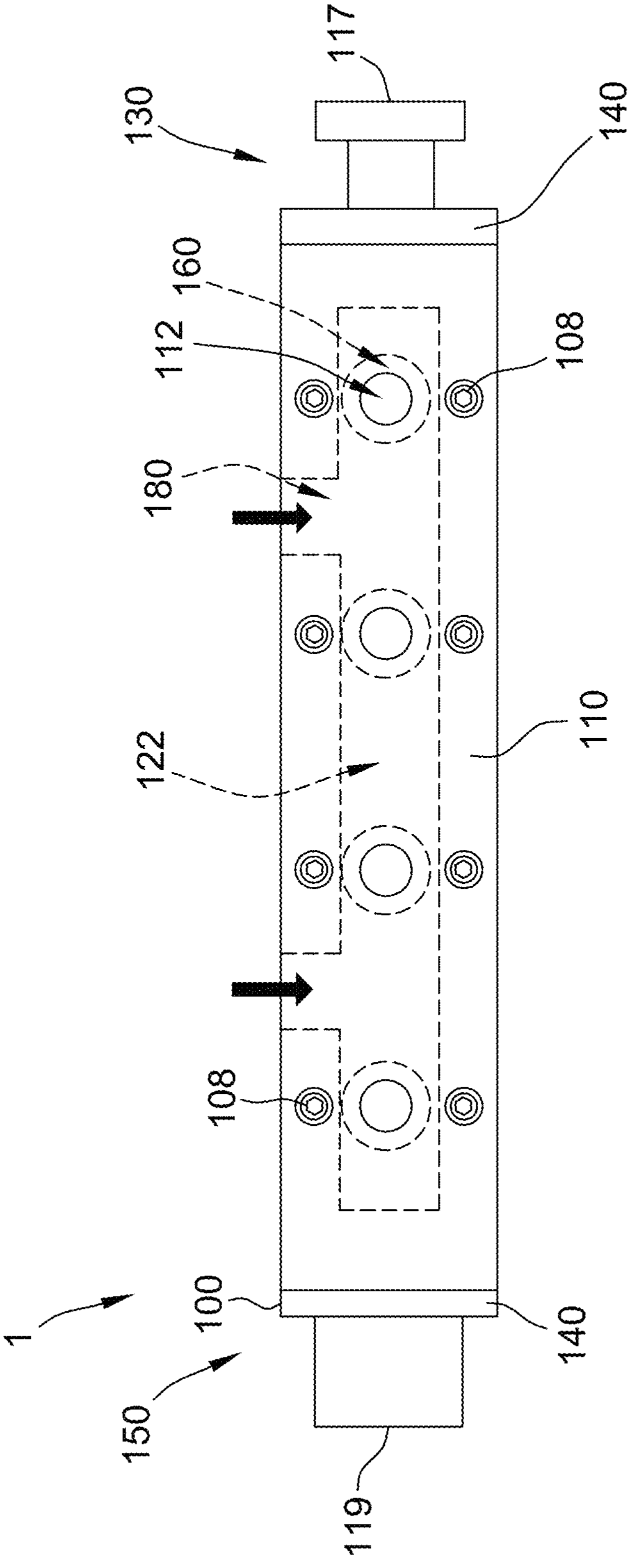
FIG. 4 is another bottom view of the slurry sprayer with the cover plate connected to the main body, wherein the dotted lines indicate the positions of the chamber, the discharge outlets, and the feed openings.

Referring now to FIGS. 2 and 4, the cover plate 110 is detachably connected to the main body 100 of the slurry sprayer 1. When connected to the main body 100, the cover plate 110 is received in the slot 124. In some embodiments, a seal ring or gasket (not shown) may be disposed between the cover plate 110 and the main body 100 to seal the cover plate 110 to the main body 100 to reduce or prevent leakage between the cover plate 110 and the main body 100. The cover plate 110 is connected to the main body 100 by fasteners 108 (e.g., screws) (FIG. 4).

The cover plate 110 includes a plurality of access apertures 112 (FIGS. 4, 8A and 8B). Each of the access apertures 112 corresponds to one of the discharge outlets 160 and communicates with the corresponding discharge outlet 160 via the chamber 122. As shown in FIGS. 4, 8A, and 8B, at least a portion of each access aperture 112 is aligned with the corresponding discharge outlet 160. This allows a cleaning device C (FIG. 8B), such as a syringe or plunger, to extend through the access aperture 112 into the main body 100 to clean the discharge outlets 160.

Figure 5:
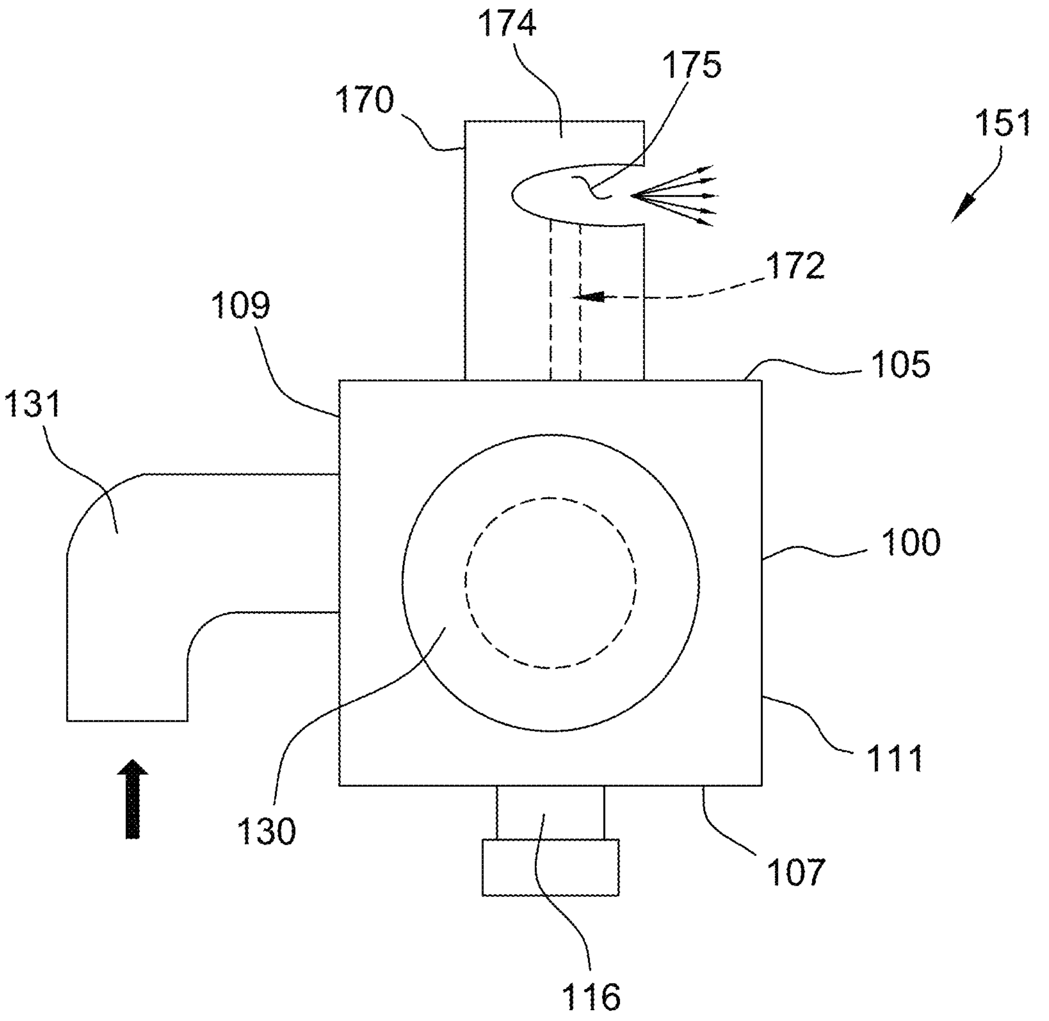
FIG. 5 is a side view of the slurry sprayer viewed from the first end toward the second end with a nozzle disposed on the main body.
Figure 6:
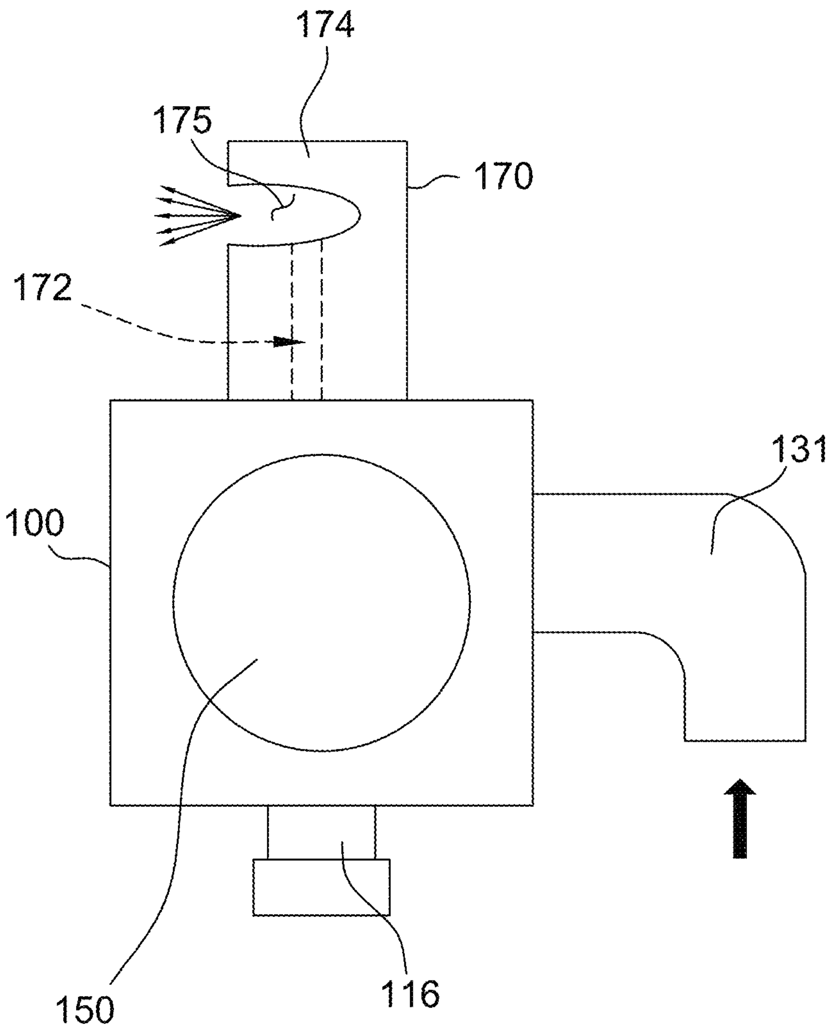
FIG. 6 is another side view of the slurry sprayer viewed from the second end toward the first end with a nozzle disposed on the main body.
Figure 7:
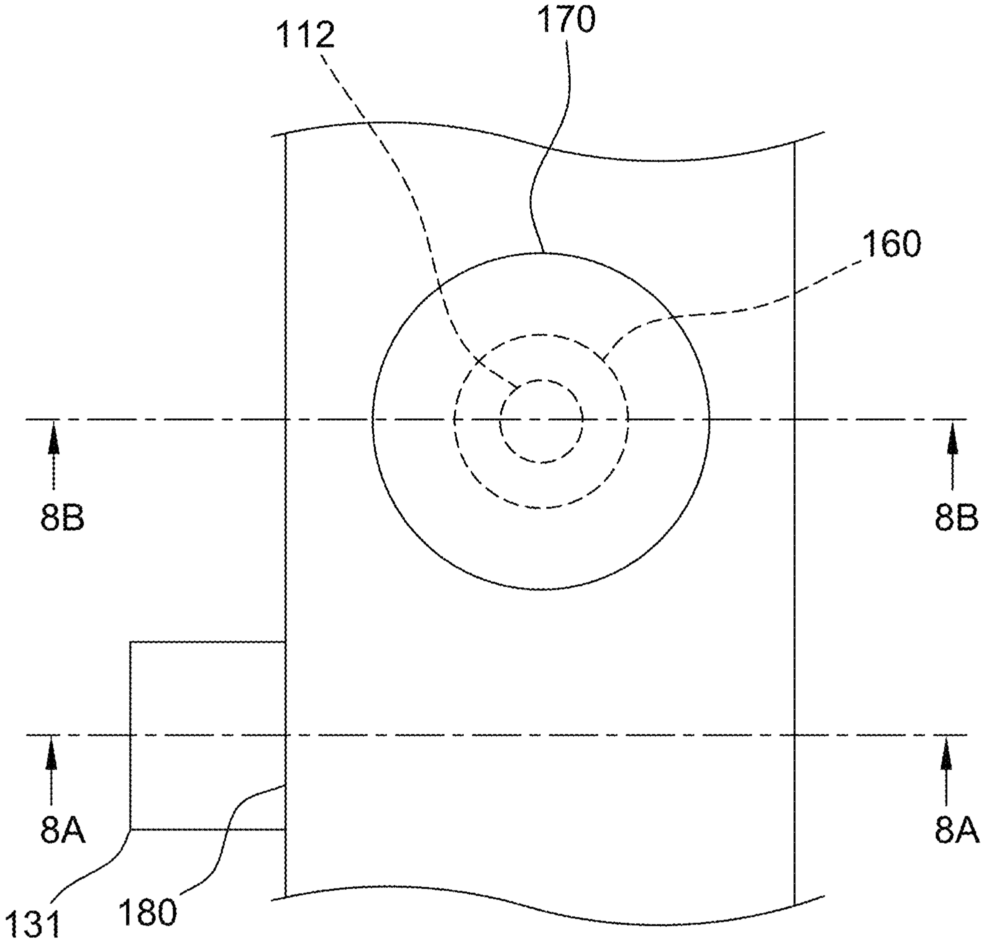
FIG. 7 is a partial top view of the slurry sprayer.

The cover plate 110 includes a plurality of plugs 116 (FIGS. 5-6). Each plug 116 is detachable from a corresponding access aperture 112 (e.g., by a threaded connection). To clean a discharge outlet 160 and/or nozzle 170, the plug 116 that is aligned with the outlet 160 or nozzle is removed from the corresponding access aperture 112 which provides access to the outlet 160 and/or nozzle 170 and allows the cleaning device C (FIG. 8B) to be used. This enables the discharge outlet 160 and/or nozzle 170 to be cleaned without removing the cover plate 110.

In the illustrated embodiment, the nozzles 170 are detachably connected to the corresponding discharge outlet 160. Each of the nozzles 170 has a channel 172 (FIGS. 5-6) that is in fluid communication with the discharge outlet 160. Each nozzle 170 has a spray portion 174 that includes a recess 175 for emitting slurry. The recess 175 is fluidly connected to the channel 172 and is angled therewith (e.g., is perpendicular). The recess 175 and channel 172 may be cleaned by use of a cleaning device such as the cleaning device C shown in FIG. 8B. The nozzles 170 may also be detached from the main body 100 (e.g., such as by unthreading the threaded connection) and separately cleaned (e.g., by use of an ultrasonic oscillator that may clean difficult to reach portions of the channel).

An adjustable support 200 for a slurry sprayer such as the slurry sprayer 1 described above is shown in FIGS. 9-11. The adjustable support 200 includes a first supporting body 220 that supports the slurry sprayer 1 toward the first end 117 of the slurry sprayer 1 and a second supporting body 240 opposite the first supporting body 220 that supports the slurry sprayer 1 toward a second end 119 of the slurry sprayer 1. The first supporting body 220 removably connects to a first connecting portion 130 of the slurry sprayer 1. The second supporting body 240 removably connects to a second end portion 150 of the slurry sprayer 1. The first and second end portions 130, 150 of the slurry sprayer 1 are connected to opposite ends of the main body 100 of the slurry sprayer 1.

The first supporting body 220 includes a first fixed base 222, a first moving member 224, a second moving member 226, and a positioning base 228. The first moving member 224 is detachably connected to the first fixed base 222, and the first moving member 224 is moveable relative to the first fixed base 222 in a first direction D1. In the illustrated embodiment, the corresponding positions between the first fixed base 222 and the first moving member 224 are adjusted by a first adjusting mechanism 223. The first adjusting mechanism 223 could be, for example and without limitation, a combination of a locking rod and a slot or a combination of a bolt and a nut.

The second moving member 226 is detachably connected to the first moving member 224, and the second moving member 226 is moveable relative to the first moving member 224 in a second direction D2. The relative position between the first moving member 224 and the second moving member 226 are adjusted by a second adjusting mechanism 225. The second adjusting mechanism 225 may be, for example and without limitation, a combination of a locking rod and a slot or a combination of a bolt and a nut.

In the illustrated embodiment, the first direction D1 is perpendicular to the second direction D2. More specifically, the first direction D1 is a horizontal direction, and the second direction D2 is a vertical direction, and both the first direction D1 and the second direction D2 are perpendicular to the longitudinal axis AX of the slurry sprayer 1.

The positioning base 228 is connected to the second moving member 226, and is rotatable relative to the second moving member 226. The main body 100 of the slurry sprayer 1 is disposed on the positioning base 228.

The positioning base 228 rotates relative to the second moving member 226 along a rotation direction R. A fifth adjusting mechanism 227 allows the positioning base 228 to be selectively locked on unlocked with respect to the second moving member 226. This allows rotatable adjustment of the positioning base 228 (and slurry sprayer 1) relative to the second moving member 226. The fifth adjusting mechanism 227 could be, for example and without limitation, a combination of a locking rod and a slot or a combination of a bolt and a nut.

In the illustrated embodiment, the positioning base 228 has a receiving surface that matches the contour of the main body 100 of the slurry sprayer 1 (e.g., rectangular as shown). In some embodiments, the slurry sprayer 1 and positioning base 228 are prevented from rotating relative to each other (e.g., due to the V-shaped profile of the base 228 and rectangular profile of the main body 100). This allows the slurry sprayer 1 to rotate with the positioning base 228.

The first supporting body 220 includes a stop member 229. When the main body 100 of the slurry sprayer 1 is disposed on the positioning base 228, the stop member 229 abuts the main body 100. The enables the main body 100 to be fixed between the stop member 229 and the positioning base 228. The stop member 229 includes a pivot member 241 and a locking member 247. The stop member 229 is pivotally connected to the second moving member 226 by the pivot member 241 to allow the stop member 229 to be lifted upward. The stop member 229 may be fixed to the second moving member 226 by the locking member 247. This allows the main body 100 of the slurry sprayer 1 to be fixed between the stop member 229 and the positioning base 228. In some embodiments, the second moving member 226 has a recess 230 (FIG. 10) and the first connecting portion 130 of the slurry sprayer 1 is disposed in the recess 230. The first connecting portion 130 may be connected to the second moving member 226 by a locking mechanism (not shown).

The second supporting body 240 (FIG. 11) includes a second fixed base 242, a third moving member 244, and a fourth moving member 246. The third moving member 244 is detachably connected to the second fixed base 242 and is moveable relative to the second fixed base 242 in the first direction D1. The second fixed base 242 and the third moving member 244 are adjusted by a third adjusting mechanism 243. The third adjusting mechanism 243 could be, for example and without limitation, a combination of a locking rod and a slot or a combination of a bolt and a nut.

The fourth moving member 246 is detachably connected to the third moving member 244 and is moveable relative to the third moving member 244 in the second direction D2. The third moving member 244 and the fourth moving member 246 are adjusted by a fourth adjusting mechanism 245. The fourth adjusting mechanism 245 could be, for example and without limitation, a combination of a locking rod and a slot or a combination of a bolt and a nut.

The fourth moving member 246 includes a recess 261 and the second end portion 150 of the slurry sprayer 1 is received in the recess 261. The second end portion 150 of the slurry sprayer 1 may rotate within the recess 261. In this arrangement, when the positioning base 228 (FIG. 10) of the first supporting body 220 rotates to adjust the incline angle of the main body 100, the second end portion 150 is able to simultaneously rotate relative to the fourth moving member 246.

Figure 12:
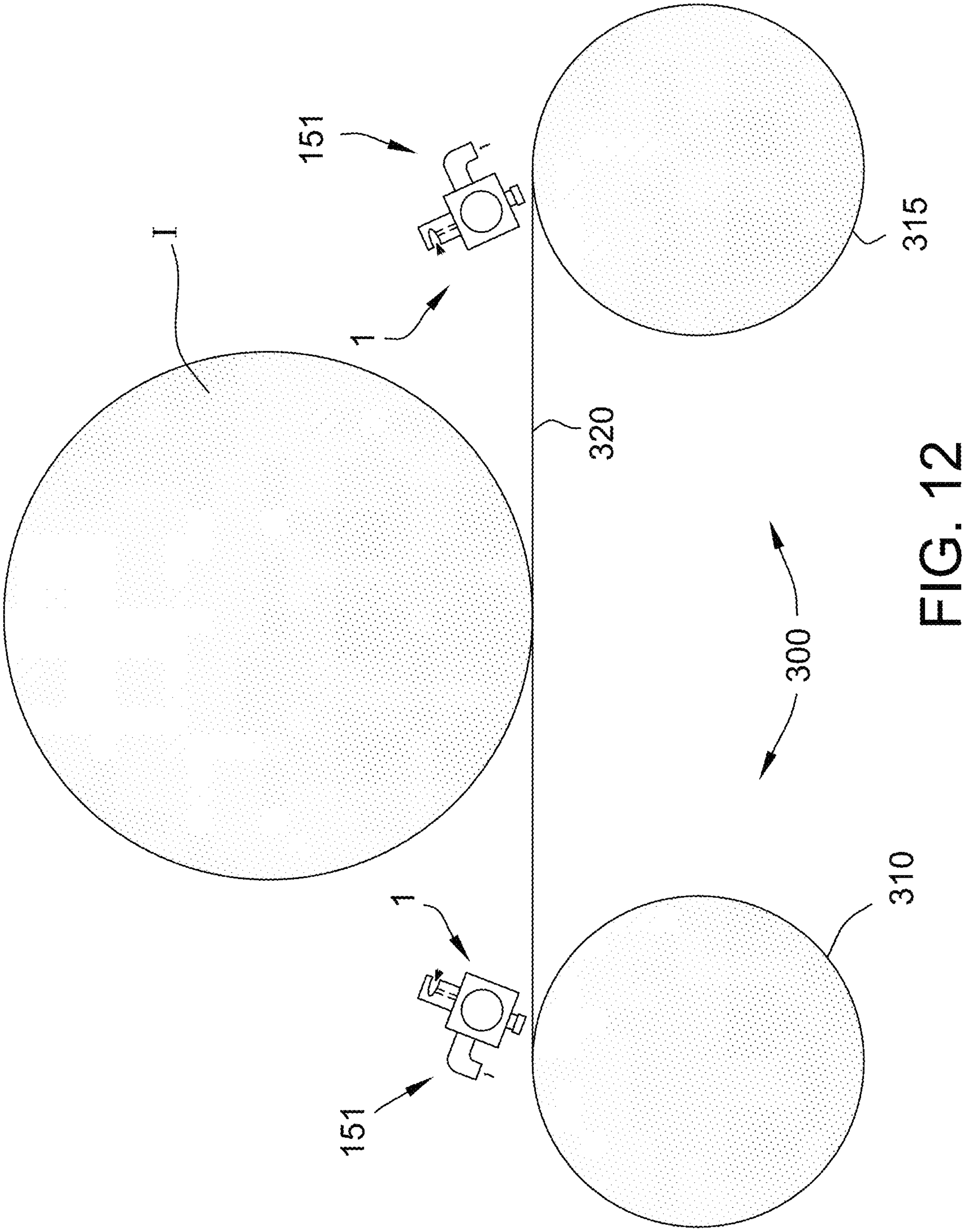
FIG. 12 is a schematic of an ingot wafering system having first and second slurry sprayers disposed above first and second main rollers.

The slurry sprayer 1 may be incorporated into an ingot wafering system 300 (FIG. 12) for slicing an ingot I (e.g., semiconductor-grade or solar-grade silicon ingot) into wafers. The example system 300 includes first and second main rollers 310, 315 and a wire web 320 at least partially disposed about the first roller 310 and the second roller 314. The wire web 320 includes a series of parallel wires. The first and second main rollers 310, 315 rotate to cause the wire web 320 to move relative to the ingot I causing the ingot I to be sliced. The wire may be fed from a feeding-spool and moved forward and reverse to slice the ingot I. The ingot I is lowered as the main rollers 310, 315 rotate. A first slurry spray system 151 having a first slurry sprayer 1 is disposed above the first main roller 310 to direct slurry through the nozzles 170 (FIG. 5) to the wire web 320 and the ingot I. A second slurry spray system 151 having a second slurry sprayer 1 is disposed above the second roller 315 to direct slurry to the wire web 320 and ingot I.

To circulate slurry through the slurry sprayer 1, slurry is introduced through the feed conduits 131 (FIG. 5). Slurry passes through the feed openings 180 (FIG. 1) and enters the chamber 122 in the main body 100 of the sprayer 100. Slurry passes through the discharge outlets 160 (FIG. 1) and into the nozzle channel 172 (FIG. 5). Slurry is expelled through the nozzle recess 175 toward the wire web 320 (FIG. 12) and ingot I.

To clean the slurry sprayer 1, the plugs 116 (FIG. 8A) may be removed from the access apertures 112 to allow the cleaning device C (FIG. 8B) to be inserted through the access aperture 112 to clean out the discharge outlet 160 and/or nozzle 170. The slurry sprayer 1 may also be cleaned by removing the cover plate 110 (FIG. 2). The fasteners 108 (FIG. 4) may be removed to allow the cover plate 110 to be removed from the slot 124 (FIG. 2) formed in the main body 100 of the slurry sprayer 1. Removal of the cover plate 110 allows access to the chamber 122 formed within the main body 100 and to the discharge outlets 160 for cleaning (e.g., with a cleaning device such as a water jet or brush).

Compared to conventional slurry sprayers, the slurry sprayers of embodiments of the present disclosure have several advantages. Access apertures that are aligned opposite the discharge outlets allow the discharge openings and nozzle to be cleaned with greater ease (e.g., without removing the cover plate). Embodiments having a removable cover plate allow for access to the chamber formed by the main body of the sprayer and for access to the discharge openings and nozzles. In embodiments in which sprayer includes at least two feed openings (e.g., with a ratio of nozzles to discharge openings being less than 8:1, 5:1 or less, or 4:1 or less), the pressure may be better balanced across the nozzles. In embodiment having an adjustable support, the sprayer may be rotated to change the incline angle to account for changes in the roller profile (e.g., reduction in diameter over time). The position of the slurry sprayer may also be adjusted for better cooling performance (e.g., horizontal and vertical positions relative to the roller, wire and/or ingot). The slurry sprayer may be adjustable in three directions—the angle of inclination of the slurry may be changed and the position of the sprayer may be moved horizontally and vertically.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A method for slicing a silicon ingot comprising:

positioning a slurry sprayer onto a first supporting body, the first supporting body supporting the slurry sprayer toward a first end of the slurry sprayer;

positioning the slurry sprayer onto a second supporting body, the second supporting body supporting the slurry sprayer toward a second end of the slurry sprayer;

adjusting the first and second supporting bodies to set the position of the slurry sprayer in a horizontal and vertical position and to set an incline angle of the slurry sprayer;

directing slurry from the sprayer to a wire web that contacts the silicon ingot to slice the silicon ingot into wafers; and moving a silicon ingot relative to the wire web while moving the wire web across the ingot to slice the silicon ingot into wafers.

2. The method as set forth in claim 1 further comprising changing the incline angle of the slurry sprayer after one or more ingots has been sliced.

3. The method as set forth in claim 1 comprising moving the horizontal and vertical position of the slurry sprayer after one or more ingots has been sliced.

4. The method as set forth in claim 1 wherein the slurry sprayer comprises a main body having a chamber defined therein for receiving slurry, a plurality of discharge outlets and a feed opening fluidly connected to the discharge outlets by the chamber, the slurry sprayer further comprising a cover plate detachably connected to the main body, the method further comprising:

removing the cover plate from the main body after one or more ingots has been sliced; and cleaning the slurry sprayer while the cover plate is removed from the main body.

5. The method as set forth in claim 1 wherein the slurry sprayer comprises a main body having a chamber defined therein for receiving slurry, a plurality of discharge outlets and a feed opening fluidly connected to the discharge outlets by the chamber, the slurry sprayer further comprising a plurality of access apertures, each access aperture being aligned with a discharge outlet, the slurry sprayer further comprising a plurality of plugs, each plug being detachable from a corresponding access aperture, the method comprising detaching each plug from the access aperture to expose the access aperture; and cleaning the slurry sprayer through one or more access apertures.

* * * * *